Figure 1:
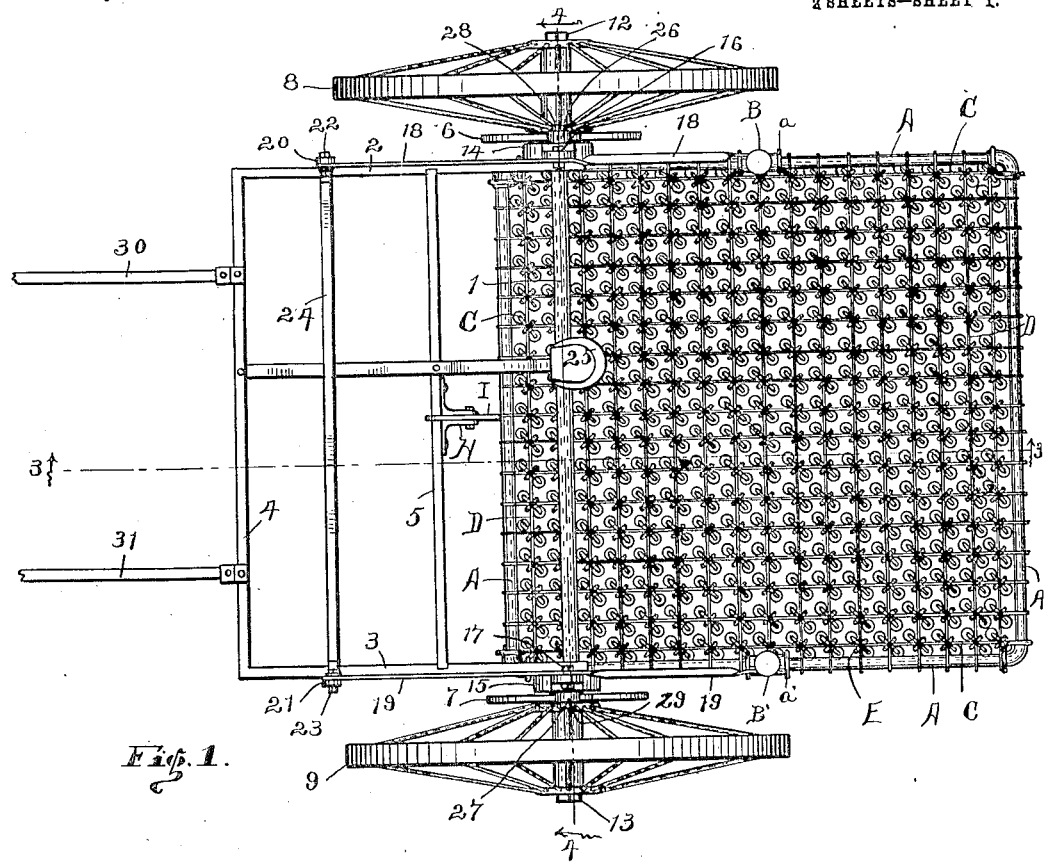

J. M. DENNIS.
MACHINE FOR THE FECUNDATION OF PLANTS.
APPLICATION FILED FEB. 26, 1909.

926,690.

Patented June 29, 1909.
2 SHEETS—SHEET 1.

Witnesses:
Adelaide Kearns
R. E. Randle

Inventor,
James M. Dennis;
By Robert W. Randle
Attorney.

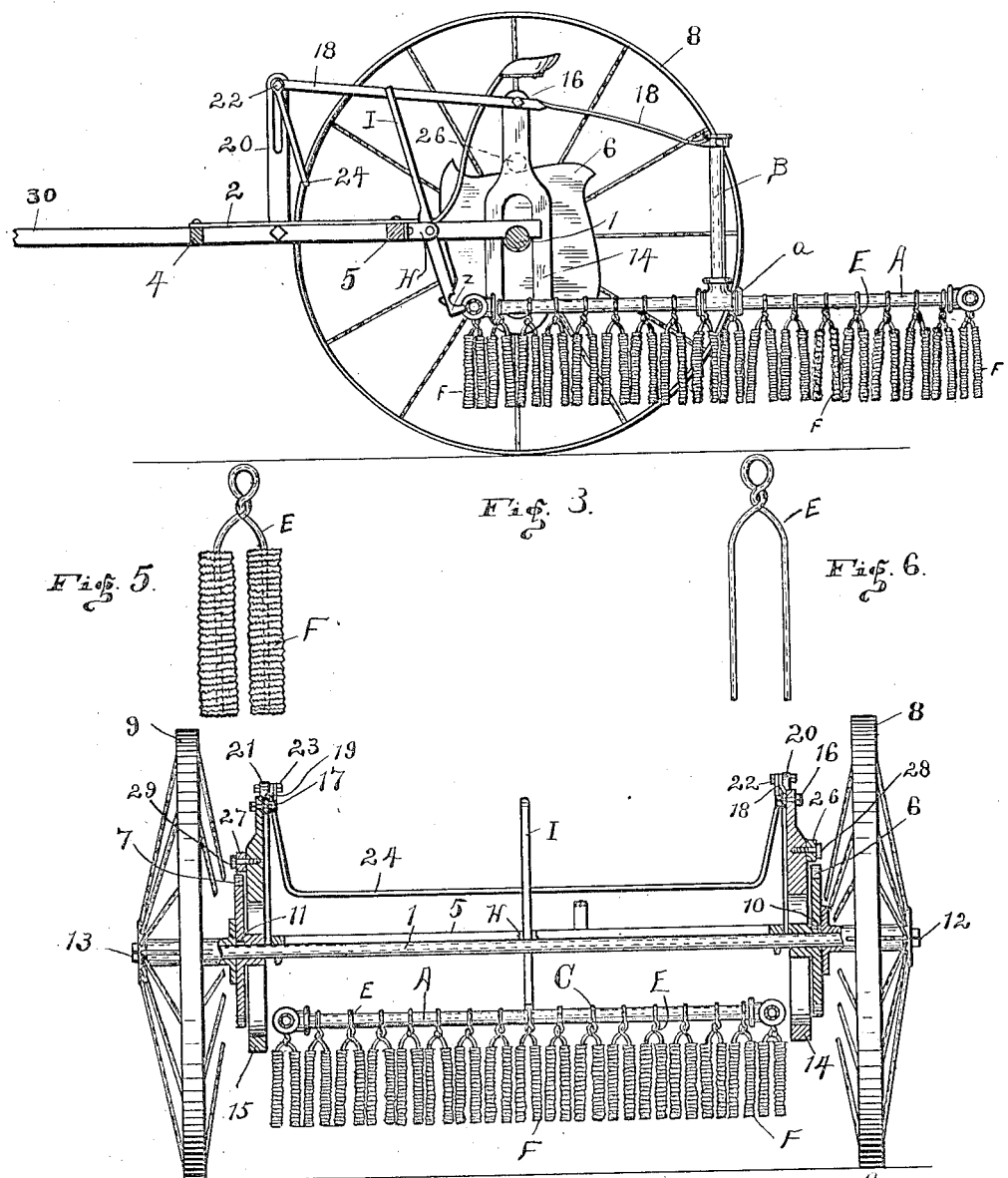

UNITED STATES PATENT OFFICE.

JAMES M. DENNIS, OF CAMBRIDGE CITY, INDIANA, ASSIGNOR, BY DIRECT AND MESNE ASSIGNMENTS, OF TWENTY-FIVE AND ONE-HALF ONE-HUNDREDTHS TO WILLIAM H. ALFORD, TWELVE AND THREE-FOURTHS ONE-HUNDREDTHS TO WALTER S. JOHNSON, AND TWELVE AND THREE-FOURTHS ONE-HUNDREDTHS TO FLETCHER JOHNSON, ALL OF INDIANAPOLIS, INDIANA.

MACHINE FOR THE FECUNDATION OF PLANTS.

No. 926,690.     Specification of Letters Patent.     Patented June 29, 1909.

Application filed February 26, 1909. Serial No. 480,209.

*To all whom it may concern:*

Be it known that I, JAMES M. DENNIS, a citizen of the United States, residing in Cambridge City, in the county of Wayne and State of Indiana, have invented a Machine for the Fecundation of Plants, of which the following is a full, clear, and comprehensive exposition and specification, being such as will enable others to make and use the same with absolute exactitude.

My present invention relates to a machine for fertilizing clover seed or the like, and in this connection it may be well to state that in the production of clover having seed which will be fertile it is an absolute essential that the pollen of the blossoms be interchanged among the bloom. Heretofore dependence has been made upon bees to perform this duty of distributing the pollen, and in some localities this has been found, in most seasons, to be sufficient but it can not be absolutely depended upon, while in other localities, most notably in Australia, this essential requisite has not been accomplished, resulting in an almost total absence of fertile seeds. Therefore to perform positively by mechanical means that which has heretofore been perfunctorily done by natural means is the primal object of this invention.

A further object is to provide mechanical means for the fecundation of plants, particularly red-clover or the like, by the employment of which the pollen of the plants may be properly distributed and interchanged, in order that fertile and healthy seed may be produced. And, finally, my object, broadly speaking, is to provide a machine for fecundating plants, which means will be strong and durable in construction, positive in its actions and results, easily operated and controlled, which may be manufactured and sold at a comparatively low price, and which will reduce the danger of non-fertilization to an almost negligible minimum.

Other objects and particular advantages of my invention will be brought out in the course of the following specification, and the particular features of the invention will be correlated in the appended claims.

One manner for carrying out the objects of my invention in a practical manner, and that which in practice has been found to be the most desirable, is shown most clearly in the accompanying drawings, in which—

Figure 2:
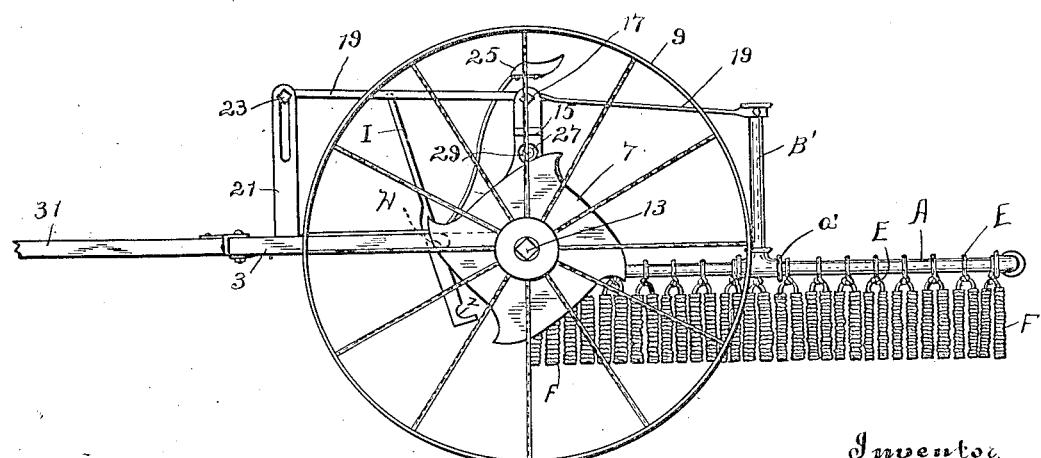

Figure 1 is a top plan view of the invention complete. Fig. 2 is a side elevation of the invention. Fig. 3 is a sectional view of the invention, taken on the line 3—3 of Fig. 1. Fig. 4 is a rear elevation of the invention, partly in section, as taken on line 4—4 of Fig. 1. Fig. 5 is a detail view showing one of the fecundating fingers alone and in completed condition, and Fig. 6 is a detail view of the skeleton or wire portion of one of said fingers.

Similar indices denote like parts throughout the several views of the two sheets of drawings.

In order that the construction and operation of my invention may be more fully understood and appreciated I will now take up a detail description thereof in which I will describe the same as briefly and as comprehensively as I may.

The body of my invention comprises a frame, which may be formed square or oblong, same being preferably formed of metal tubing, the corners being formed of metal elbows, all of said parts being connected rigidly together forming the frame A. The two side members of this frame are each divided into two equal parts which are connected by T-fittings $a$ and $a'$ as indicated.

Secured in and extending upward from said fittings $a$ and $a'$ are the respective standards B' and B' which are for the purpose hereinafter set forth.

Connecting the side members of the frame A are a multitude of wires D which are arranged an equal distance apart; and in like manner connecting the front and the rear members of the frame A are a multitude of wires C which are placed the same distance apart as are the wires C over which they cross. The wires C and D being at right angles to each other of course cross each other, and they are located in the same plane, thereby forming a multitude of substantially square meshes.

The essential requisite of this invention are the fingers E which hang pendent from said wires and these fingers may be made as follows: The body or base of each of said fingers may consist of a single length of comparatively fine wire or the like cut to the proper length and doubled in the center, forming an eye at the loop, and then placed diagonally over an intersection of two of the wires C and D as shown in Fig. 1, after which the two parts of said wire are twisted about each other on the underside of the screen, formed by the wires C and D, thereby forming an eye through which the wires C and D cross each other. Said eye, of each of said fingers, should be of such size as not to secure the fingers rigidly but such as to allow them to hang pendent and free to swing. The two downwardly projecting branches of each of said fingers E are covered with a fuzzy material F, such as lint or fibrous down or the like, which before being used is covered with a very fine layer of rubber, which can not be shown in the drawings, but the operation consists in providing a light fluid rubber and then dipping the fingers therein, this forms a waterproof covering yet it does not destroy the fuzziness of the material treated but renders it waterproof.

The above described parts comprise the basic portions of my present invention, the other parts herein shown, and which I will now describe, are simply means for carrying the before mentioned parts into effect in a practical and efficient manner.

The numeral 1 denotes a shaft which is longer than the frame A is wide and over which it extends.

Numerals 2 and 3 denote the two sides of the auxiliary-frame, which parts are in alinement with and extend forward parallel with the sides of the frame A, but they have no direct connection therewith.

Numerals 4 and 5 denote the two cross members of the auxiliary-frame, the member 5 being located near the center portion of the members 2 and 3, and the member 4 being located across the forward ends thereof. The rear ends of the members 2 and 3 are pivotally connected to the shaft 1, as indicated in Fig. 3.

Rigidly connected around the shaft 1, and located a short distance outward from the connections of the members 2 and 3 with the shaft, are the cams 6 and 7, which are identical with each other, each being formed substantially square and each having four corners connected by a substantially straight line whereby their peripheries are formed substantially as shown in Figs. 2 and 3.

Mounted on the outer end portions of the shaft 1 are the traction wheels 8 and 9, these when in position are rigidly connected to the respective cams 6 and 7, and thereby indirectly connected to the shaft 1, by the pins 10 and 11, respectively. Said pins 10 and 11 project inward parallel with the shaft 1 from the inner faces of the hubs of the wheels and enter apertures therefor formed in the outer faces of the cams 6 and 7, as shown in Fig. 4. Said wheels are secured on the axle or shaft 1 by the nuts 12 and 13, respectively, which are threaded onto the outer ends of the shaft 1.

Extending inward around the shaft 1 from the inner faces of the cams 6 and 7 and formed integral therewith are the cam-hubs, as indicated in Fig. 4.

The numerals 14 and 15 denote the respective right and left hand stirrups, whose apertures therethrough are formed longitudinally thereof, said apertures being of a cross diameter only slightly more than is the diameter of the hubs which operate therein, as shown in Fig. 3. By the above it is apparent that when the stirrups are retained in their vertical (normal) position they may be moved vertically but not laterally.

Mounted by the pivot-bolts 16 and 17 to the sides of the upper portions of the respective stirrups 14 and 15 are the respective bars 18 and 19, each projecting both forward and rearward. Just in the rear of said bolts 16 and 15 said bars 18 and 19 are given a quarter twist, in order that the forward portions of said bars may stand edgewise while their rear portions are flatwise that they will act as springs for the purpose hereinafter made apparent. The rear ends of said bars 18 and 19 are pivotally connected to the sides of the upper portions of the standards B and B', respectively.

Extending upward from near the forward ends of the members 2 and 3 are the posts 20 and 21, each having a slot formed longitudinally thereof in their upper portions. The forward ends of the bars 18 and 19 terminate near said posts and they are slidably connected thereto by the bolts 22 and 23, which latter are adapted to operate up and down in said slots of the posts 20 and 21. Also secured by said bolts 22 and 23 and connecting the bars 18 and 19 is the elongated foot-bar 24.

The numeral 25 denotes the driver's seat which may be connected to the auxiliary frame as shown.

Extending out from the face of each of the stirrups 14 and 15, at points directly above the upper ends of the aperture therethrough, are the rollers 26 and 27, each mounted on its respective bolt 28 and 29, whereby they will revolve on the peripheries of the respective cams 6 and 7, as indicated in Fig. 2.

Numerals 30 and 31 denote shafts, or a tongue may be substituted therefor, to provide means whereby a horse may be hitched to the machine for the purpose of pulling it over the ground.

Extending back from the center portion of the member 5 is a hanger H, in which is pivoted the lever I, the lower rear face of said lever is provided with a notch z which is adapted to fit under the center portion of the forward member of the frame A, as indicated in Fig. 4, and it is for the purpose hereinafter set forth.

Operation: From the above the operation of the machine may have been anticipated, and it is substantially as follows: The machine may be drawn by a horse or the like to be hitched between the shafts 30 and 31, the operator to be located on the seat 25.

The machine is intended to be drawn to-and-fro over a field of blooming clover or the like, which should occur at such time when the pollen of the bloom is in condition for distribution.

As the machine is moved forward the frame A is gently raised and abruptly lowered, in this instance four times during the distance traveled by the wheels in one revolution. Said raising and lowering of the frame A is caused by the cams 6 and 7, which are carried revolubly with the wheels 8 and 9, said cams engaging the rollers 26 and 27 and forcing the stirrups upward, thereby causing the bars 18 and 19 to lift up the frame A which is centrally balanced by the standards B and B' to which said bars are connected as shown. As the device moves forward it is apparent that when the rollers 26 and 27 run off of the points or corners of the cams the frame will drop a limited distance, and by reason of the rear spring portions of the bars 18 and 18 the shock will be somewhat absorbed thereby. Said spring portions of said bars will also cause the frame to vibrate somewhat up and down, and by reason of the manner in which said frame is mounted it will have a limited motion in every direction, which is desirable in order to accomplish the desideratum.

The limits of movement of the frame A, vertically, is substantially as indicated in Figs. 2 and 3, in the former it is shown at its highest limit, and in the latter at its lowest.

The movements of the frame A result in causing the fingers E to be agitated and to enter the bloom, the fuzz-like covering of the fingers becoming covered with the pollen which is carried to other bloom, similar to that accomplished by bees, and in this way the pollen is mixed and carried from bloom to bloom, thereby fertilizing the bloom and causing them to be fecundated, thereby accomplishing the object of this invention.

As the machine is being used the driver may, when so desired, place his feet on the foot-bar 26 and press downward which will, manifestly, cause the frame A to be raised, in order to clear an obstruction or to adjust the frame to unevenness of the ground. And when conveying the machine from place to place, when not in use, the notch z may be engaged with the frame A and if the lever I be then pushed forward it will raise the frame and carry it free of obstructions.

I desire that it be understood that I am not to be limited to the details of construction herein shown and described, neither am I to be limited to the means herein shown for operating the fingers of pollen distributers, as these may be variously changed and the operation may be accomplished in various ways.

What I do claim, and desire to secure by Letters Patent of the United States, is—

1. A machine for distributing pollen from bloom to bloom in order to fecundate the seeds thereof.

2. A fecundating machine comprising a plurality of fingers adapted to gather and distribute the pollen of plants.

3. A fecundating machine comprising a plurality of fuzzy fingers adapted to gather and distribute the pollen of plants.

4. A fecundating machine comprising a plurality of fuzzy fingers or the like adapted to gather and distribute the pollen of plants, and means for agitating the fingers.

5. A fecundating machine comprising a plurality of fuzzy fingers or the like, and means for rendering the fuzz waterproof.

6. That improvement in the art of fecundation which consists in carrying the fecundating material from plant to plant by mechanical means.

7. A machine for the fecundation of plants, including a frame, means for agitating the frame, a series of wires disposed over the frame, fingers suspended from said wires, means carried by the fingers for carrying pollen from plant to plant, and means whereby the machine may be conveyed over the ground.

In testimony whereof I have hereunto subscribed my name to this specification in the presence of the subscribing witnesses.

JAMES M. DENNIS.

Witnesses:
 ROBERT W. RANDLE,
 R. E. RANDLE.